UNITED STATES PATENT OFFICE.

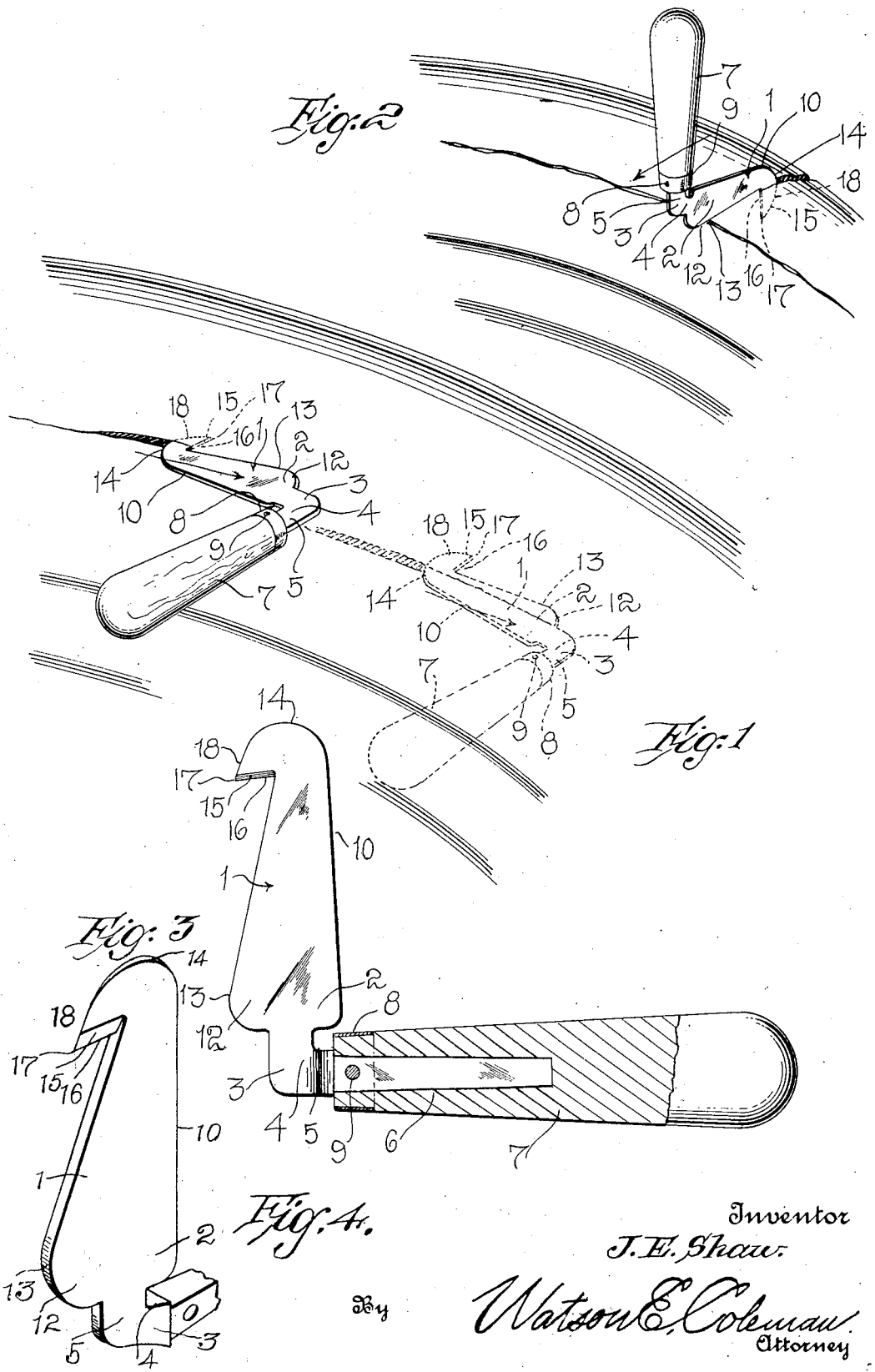

JAMES E. SHAW, OF TRINIDAD, COLORADO.

TOOL FOR CUTTING TIRE-TREADS.

1,328,547.  Specification of Letters Patent.  Patented Jan. 20, 1920.

Application filed April 16, 1919. Serial No. 290,591.

*To all whom it may concern:*

Be it known that I, JAMES E. SHAW, a citizen of the United States, residing at Trinidad, in the county of Las Animas and State of Colorado, have invented certain new and useful Improvements in Tools for Cutting Tire-Treads, of which the following is a specification, reference being had to the accompanying drawings.

This invention relates to an improved tool or knife adapted particularly for use for cutting tire treads, whereby surfaces of tires may be renewed by vulcanizing new treads thereon.

The invention further aims to provide a tool of this general character, which is simple, efficient and practical in construction, and one which is exceedingly inexpensive to manufacture, allowing it to be sold at a reasonable profit.

The invention further aims to provide a cutting tool or knife embodying means on one edge of the knife to ride on the surface of the tire, so that together with the manipulation of the handle, the depth of a cutting edge (which is remote and in a plane at right angles to the means) into the side of the tire adjoining the tread may be regulated or gaged. In other words, this means consists of a bulge or belly portion (which is dull) on one edge of the knife, to ride on the surface of the tire, whereby the tool blade may have a fulcrum relation to the tire, by tilting the handle in one direction or the other. It is obvious that by this manipulation of the tool, the depth of said cutting edge may be gaged, hence regulating the depth of the cut.

To remove or cut the tread of a tire, the tool blade is drawn along the tire adjacent one side of the tread, the handle extending at right angles to the tire to hold the tool blade in its proper position, then the corresponding opposite side of the tire is likewise cut. Subsequently, one or more cuts in the tread surface may be made transversely, thereby permitting the tread surface of the tire to be removed.

The invention further aims to provide a tool blade having a right angle extending shank, on which a wood handle is mounted, whereby the handle may be easily grasped by an operator, for the manipulation of the tool.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective, showing a portion of a tire, and illustrating the tread cutting tool as disposed in relation thereto, showing the position the tool assumes when making the cuts, and also illustrating one or more positions of the tool in dotted lines.

Fig. 2 is a view showing the tool in position extending transversely of the tire, whereby a transverse cut may be formed.

Fig. 3 is a detail view of the tool, showing the handle thereof in section.

Fig. 4 is a detail perspective view of the tool blade more clearly showing the features and shape thereof.

Referring more especially to the drawings 1 designates the tool blade; which may be any suitable shape or configuration, preferably as illustrated, therefore the blade is constructed from a piece of metal preferably steel, and is provided with a body part 2. Extending from the body part and gradually becoming larger as shown at 3 is a shank 4. This shank is substantially rectangular in cross-section, and is bent on itself at right angles as indicated at 5. The shank beyond this bend is in the form of a gradual taper, and is fitted in a socket 6 of a wood handle 7, which may be any suitable shape or configuration, and of such general character as to permit an operator to easily and firmly grasp the same. A sheet metal band 8 is fitted on one end of the handle adjacent the end thereof through which the shank extends. A suitable pin or rivet or the like 9 is passed transversely of the band and through the handle, and through the shank, thereby securing said parts firmly together.

Obviously, as shown, the body 2 merges into the tool blade, and 10 denotes the back edge of the blade, while 11 designates the front edge (which is dull) extending or arranged at an acute angle to the back edge.

Adjacent the body the blade is provided with a protuberance or belly portion 12, and it is to be noted that the part 13 of this belly or protuberance portion is designed to ride upon the surface of the tire near that portion of the tread to be severed and subsequently removed. The end part of the blade opposite the body 2 is rounded off as shown at 14.

Adjacent the rounded end part of the blade a cutting edge 15 is provided. This cutting edge (which is exceedingly sharp) extends in a plane at right angles to the back edge 10 of the tool blade, and since it extends at an acute angle to the edge 11 of the blade, a notch 16 is formed. It is to be noted that the protuberance is offset in a plane to one side of the extremity 17 of the cutting edge, therefore it will be seen that the protuberance may ride upon the surface of the tire without allowing the cutting edge to cut in the tire. It is to be further observed that the edge portion 18 of the blade merges from the cutting point 17 of the cutting edge, as shown, and is therefore at an acute angle to the cutting edge 15, thereby providing an angular blade portion of minimum dimensions, which will easily enter and cut the tire adjacent the tread surface. It is to be noted that when the edge of the protuberance or belly portion is riding upon the surface of the tire near the tread thereof, a fulcruming bearing is attained. In other words, this portion may fulcrum and bear on the tire, and the fulcruming action of the blade may be governed by the manipulation of the handle. For instance, rocking the blade on this fulcruming bearing by moving the handle in one direction will increase the depth of cut made by the cutting edge 15, while fulcruming the blade oppositely, moving the handle in an opposite direction, will decrease the depth of the cut made by the cutting edge 15. However, it is to be noted that the depth of cut is at its greatest, when the entire edge 11 is riding upon the surface of the tire near the tread. In other words, the edge 11 when its full length is engaging the surface of the tire, will limit the depth of the cut. After cutting the tire as illustrated in Fig. 1 on one side of the tread, the opposite side of the tire may be correspondingly cut. Then one or more cuts may be made transversely of the tread, allowing the tread surface to be removed. Furthermore, it is obvious that the side cuts in the tire may be increased or made deeper, that is beyond the limit which is governed by the entire edge 11 by riding the edge of the protuberance or belly portion in the bottom of the cut. In this case, the cutting point 17 and cutting edge 15 will go deeper into the tire, but in a plane parallel to and under the tread surface.

The invention having been set forth, what is claimed as new and useful it:

A tire tread cutting tool, comprising a blade body, which has a wide portion at one end, and is provided with an inclined dull bearing edge substantially approximating the length of the blade, and adapted to ride upon the tread surface of the tire, the outer end of the blade having a hook portion provided with a cutting edge extending at a slight acute angle to the dull inclined bearing edge, said cutting edge terminating in a pointed part, said wide portion at one end of the blade body having a wide substantially gradual curved belly part constituting a fulcruming bearing adapted to fulcrum upon the tread surface of the tire when the blade is tilted, and a handle projecting at right angles to the back edge of the blade body in a position closely approximating the fulcruming bearing, whereby said handle may be employed for tilting the blade body on the fulcruming bearing, to regulate the depth of the cut to be made by the cutting edge, said fulcruming bearing or belly part protruding laterally beyond the point of the cutting edge, in order to facilitate the regulating of the depth of the cut made by said cutting edge, when the handle is manipulated.

In testimony whereof I hereunto affix my signature in the presence of two witnesses.

JAMES E. SHAW.

Witnesses:
C. E. BENNETT,
E. L. HARNISH.